United States Patent Office 3,493,408
Patented Feb. 3, 1970

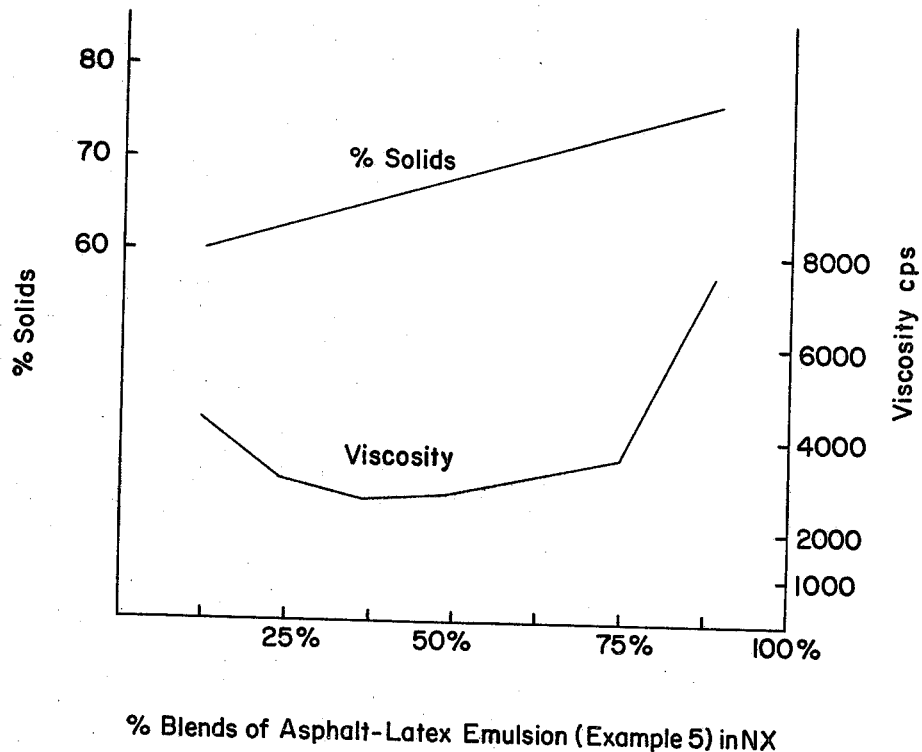
% Blends of Asphalt-Latex Emulsion (Example 5) in NX

3,493,408
STABILIZED MINERAL CLAY ASPHALT LATEX EMULSIONS
John J. Drukker, Wyckoff, N.J., assignor to The Flintkote Company, New York, N.Y., a corporation of Massachusetts
Filed Sept. 29, 1965, Ser. No. 491,171
Int. Cl. C08h 13/00
U.S. Cl. 106—277    8 Claims

ABSTRACT OF THE DISCLOSURE

A stabilized aqueous dispersion of a bituminous dispersion and an effective amount of a dispersing agent, a latex and stabilizing amounts of a stabilizer selected from the group consisting of oxalate salts of alkali metals, ammonium and mixtures thereof and the process of making these dispersions.

---

This invention relates to a process for producing stable bituminous-latex dispersions or emulsions and more particularly relates to the production of mineral clay-dispersed bituminous-latex emulsions that are stabilized by adding oxalates of ammonium and alkali metals or mixtures thereof to the clay-dispersed bitumen and to the products thereby produced.

For many years aqueous dispersions and emulsions of bituminous materials such as pitch and asphalt have been widely used. Such emulsions in commercial use generally fall into two classes: one utilizing a soap or detergent or some other anionic material as the dispersing agent, and the other utilizing a mineral colloidal clay as the dispersing agent. Bituminous blends of soap-type anionic bituminous emulsions with latices, such as natural or synthetic latices, are known to form bituminous coatings having better film flexibility, strength, adhesion and heat flow resistance than bituminous emulsions derived from the anionic bituminous emulsions alone.

Further, it is also known that mixing a mineral colloidal clay-dispersed bituminous emulsion and a soap-dispersed bituminous emulsion produces stable emulsions which have viscosities that are considerably lower than that of the clay-dispersed emulsions. The reduction in viscosity is believed to be caused by void packing of particles of different diameters and by dispersing properties of the soap or anion emulsifier. Blends of this type, having a high solid content and low viscosity, have been used to great advantage in applications where fast curing and thin films having high solid contents are desired. Nevertheless, films formed with known prior art bituminous emulsion blends possess properties which are limited by the absence of a latex.

In many applications, the clay-type of emulsions are particularly advantageous. For example, the weathering and heat flow resistance of mineral colloidal clay-type bituminous emulsions are far superior to bituminous emulsions in which soap and other chemicals are used as the emulsifying agent.

Thus there has been a desire in the art to blend mineral colloidal clay bituminous emulsions with anionic latex emulsions or anionic bituminous-latex emulsions in order to produce compositions possessing properties superior to those compositions obtained from blending a soap-dispersed bituminous emulsion and a latex.

However, until now, blends of mineral colloidal clay bituminous emulsions with anionic latex emulsions or anionic bituminous-latex emulsions were too unstable for use since mineral colloidal clay-dispersed bituminous emulsions normally contain small percentages of alkaline earth metals, such as calcium in the clay phase, which are not compatible with the latex or bituminous-latex systems.

It is, therefore, an important object of this invention to provide stable clay-dispersed bituminous-latex emulsions and an economical method of making them.

Another important object of this invention is the stabilization of mineral colloid clay dispersions of bituminous substances to permit stable blending with: low stability soap-type bituminous emulsions; anionic type latices; and/or soap-type bituminous-latex emulsions.

Another important object of this invention is to produce high solid content-clay-dispersed bituminous-latex emulsions which are easier to work with and have relatively low viscosities.

Another important object of this invention is to produce clay-dispersed bituminous-latex emulsions which wet surfaces readily and form coatings which cure rapidly to form films having improved adhesion, strength, flexibility, heat stability and water resistance.

Other objects, advantages and features of my invention will be apparent to those skilled in the art from the following description and claims.

In accordance with the present invention mineral clay-dispersed bituminous-latex emulsions are formed by stabilizing the clay-bitumen emulsion with an oxalate of potassium, sodium or other alkali metal, or ammonium before it is added to the latex emulsion or the soap-type bituminous-latex emulsion. The properties of the resultant blends produced in accordance with this invention can be modified by varying the proportions and types of the component emulsion systems.

Further, the invention also resides in a method for the stabilization of mineral clay bituminous emulsion by the use of a salt of oxalic acid to insolubilize the calcium ions present in the mineral clay dispersing agent, to permit compounding with low stability bituminous emulsions, latices and bituminous-latex emulsion. In the absence of such stabilization, the free calcium ions would de-stabilize these emulsions whose dispersing systems are composed of soaps of rosins and fatty acids.

The bituminous materials that may be used to form the clay and soap-dispersed bituminous emulsions are well known in the art. The bituminous materials may be selected from water-insoluble, water-dispersible, organic thermoplastic bituminous substances normally solid, semi-solid or viscous liquids at ordinary atmospheric temperatures. Examples of these materials are bitumens, such as petroleum and native asphalts; pyrogenous residues, such as blown petroleum asphalts, sludge asphalts, pressure tars and coal tar pitches, etc. Of these materials, petroleum asphalt is most advantageously used, and it may be produced by steam-refining by air-blowing, by solvent extraction methods or by a combination of such methods.

Clay-dispresed bituminous emulsions and soap-dispersed bituminous emulsions and methods of making them are well known in the art, and various types of mineral colloidal clay dispersing agents have been used, with or without other colloidal materials, to form such bituminuous emulsions. The preferred clay to be used in these compositions is bentonite because it produces a more stable emulsion and renders the dried films produced more resistant to flow at temperatures above the melting point of the bituminous material.

Similarly any anionic soap or like anionic dispersing agent for bituminous substances may be used to form the anionic bituminous emulsion.

To the best of our knowledge, oxalates of alkali metals and ammonium are the only stabilizing materials that are able to adequately stabilize the clay-dispersed bituminous-latex dispersions or emulsions of this invention. Oxalyic acid itself is not a satisfactory stabilizer. Various tests were conducted to determine whether the use of other alkali metal sequestering agents, such as tetrasodium ethylene diamine tetraacetate, produced similar stabilizing results. In each instance the clay-dispersed bituminous-latex emulsion increased in viscosity and formed granular agglomerates during storage. However, when the oxalate salts were used as the sequestering agent, the emulsion maintained a uniform viscosity and remained smooth and stable during a three year test period.

The latex component can be any known natural or synthetic rubber latex or latex combination. The preferred latices are derived from conjugated dienes, such as those derived from butadiene-styrene (SBR), isoprene, and butadiene-acrylonitrile.

A chart listing the typical properties of some SBR latices that have been mixed into the compositions of this invention follows.

| Latex | 2102 | 2105 | 2107 | 2711 | 5010C |
|---|---|---|---|---|---|
| Sp. gr | 0.96 | 0.99 | 1.00 | 1.02 | 1.00 |
| Total solids, percent | 61.0 | 62.0 | 62.0 | 53.0 | 58.0 |
| Bound styrene, percent | 14 | 25 | 44 | 59 | 45 |
| pH | 11.0 | 10.5 | 10.5 | 11.5 | 10.5 |
| Viscosity, c.p.s. | 1,500 | 800 | 500 | 50 | 600 |
| Mooney Viscosity ML4 | | 140 | 140 | 60 | 90 |
| Particle size Angstrom | | 1,600 | 1,600 | 1,800 | |
| Emulsifier | (1) | (2) | (2) | (3) | (3) |

1 Potassium oleate.
2 Rosin and fatty acid soaps.
3 Rosin soap.

The following example illustrates one specific method of stabilizing a mineral clay bituminous emulsion.

EXAMPLE I

A 20% solution of potassium oxalate was prepared by dissolving oxalic acid in water and reacting it with potasium hydroxide. Other alkali metal oxalates, such as sodium oxalate, could have been used and kindred results obtained. The formula used to produce the 20% solution potassium oxalate was:

| | Percent |
|---|---|
| Water | 74.1 |
| Oxalic acid | 13.7 |
| KOH | 12.2 |

A typical mineral colloid clay bituminous emulsion used in these systems has the following composition:

| | Percent wt. |
|---|---|
| Asphalt (melt point, °F., 125; penetration, 77° F., 55) | 60.95 |
| Bentonite | 1.98 |
| Potassium bichromate | 0.07 |
| Water | 37.00 |
| | 100.00 |

Formult for NX—

| | |
|---|---|
| Asphalt clay emulsion (above) | 96.5 |
| 20% solution potassium oxalate | 3.5 |
| | 100.0 |

This stabilized emulsion has a ratio of 2.5 to 3.0 parts bentonite to each part of potasium oxalate. After thorough mixing this emulsion was stored at least 24 hours before it was combined with various anionic-type latices or soap-type bituminous-latex emulsions to produce emulsions of desired stability.

Types of clay bituminous emulsions which can be similarly stabilized with alkali and amonium oxalates have asphalt components with a melting point range of 100 to 185° F. and a penetration at 77° F. of 5 to 100 tenths of millimeters. The scale used to determine penetration of the asphalt was in tenths of millimeters and the test method is described in ASTM D5–61. The percent solids present in these emulsions is between 58 and 65%.

The graph shown in FIGURE 1 shows how the percent solids present in the blended compositions of this invention and viscosity of these blends (in c.p.s.) varies with varying amounts of oxalate stabilized emulsion (NX) and the asphalt-latex emulsion composition of Example 5 set forth below. The compositions of these systems are very easy to vary and this flexibility permits changing the types and amounts of asphalt and latex present to give unusually fluid products having relatively high solid concentrations, or if desired more viscous fluids having even higher solid concentration.

A study of five SBR latices compounded with basic clay emulsions containing various stabilizer concentrations showed that when the ratio of bentonite clay to stabilizer (dry oxalate) is 2.5, the percentage of latex in the composition should preferably be greater than 2.5 times this ratio in order to maintain product dispersion stability. This means that stability of the final dispersion or emulsion blend is a function of the dilution factor of the latex or the ratio of latex to clay emulsion. For example, where the bentonite to stabilizer ratio is 3, the percentage of latex in the blend should be more than 3×2.5 or more than 7.5 in order to maintain proper stability. The test results set forth in Table I further illustrate this correlation.

Table I indicates the percent latex liquid blended with clay emulsion which has been prestabilized with varying ratios of bentonite (the dispersing agent in the clay emulsion) to stabilizer (dry salt of sodium or potassium oxalate) and the final compound stability of each system. These standards were used to determine product stability: "Good" indicates no break or agglomeration of latex system, no marked increase in viscosity and storage stable to viscosity; "Unsatisfactory" indicates break of latex system with formation of very coarse particles and initial increase in viscosity; "Fair" indicates some initial increase in viscosity and short term stability.

TABLE I

| Percent latex in blend | Latex no. | Bentonite/ stabilizer ratio | Product stability |
|---|---|---|---|
| 8 | 2102 | 2.7 | Good. |
| 9 | 2102 | 2.7 | Do. |
| 9 | 2102 | 5.0 | Unsatisfactory. |
| 9 | 2102 | 10.0 | Do. |
| 9 | 2102 | 5.7 | Do. |
| 11.4 | 2102 | 3.0 | Good. |
| 9 | 2102 | 3.0 | Unsatisfactory. |
| 5 | 2102 | 3.0 | Do. |
| 3 | 2102 | 2.7 | Good. |
| 26 | 2105 | 3 | Do. |
| 30 | 2107 | 2.7 | Do. |
| 8 | 2107 | 2.7 | Do. |
| 9 | 2107 | 2.7 | Do. |
| 17 | 2107 | 2.7 | Do. |
| 30 | 2711 | 2.7 | Do. |
| 8 | 2711 | 3.0 | Do. |
| 9 | 2711 | 2.7 | Do. |
| 19 | 2711 | 3.0 | Do. |
| 30 | 5010C | 2.7 | Fair. |
| 8 | 5010C | 6.0 | Good. |
| 11.5 | | | |

Examples which show typical combinations of anionic-type latices with oxalate pre-stabilized asphalt clay smulsion (NX) to produce systems having good stability are set forth in Table II.

The term NX is used as the base code for all treatments of a clay emulsion with the oxalate stabilizer. As shown in Table II NX (the stabilized clay emulsion) is blended in various percentages with various latices to form compositions of good stability. A typical composition of clay emulsion:

| | Percent wt. |
|---|---|
| Asphalt (melt point °F., 125; penetration, 77° F., 55) | 60.950 |
| Bentonite | 1.980 |
| Potassium bichromate | 0.066 |
| Water | 37.000 |
| | 100.000 |

A typical composition of NX—

| | |
|---|---|
| Asphalt clay emulsion (above) | 96.5 |
| 20% solution potassium oxalate | 3.5 |
| | 100.0 |

TABLE II

| Test No. | Percent NX | Percent Latex | Latex No. |
|---|---|---|---|
| 1 | 92 | 8 | 2102 |
| 2 | 91 | 9 | 2102 |
| 3 | 74 | 27 | 2102 |
| 4 | 70 | 30 | 2105 |
| 5 | 92 | 8 | 2107 |
| 6 | 91 | 9 | 2107 |
| 7 | 83 | 17 | 2107 |
| 8 | 70 | 30 | 2107 |
| 9 | 92 | 8 | 2711 |
| 10 | 91 | 9 | 2711 |
| 11 | 81 | 19 | 2711 |
| 12 | 70 | 30 | 2711 |
| 13 | 89 | 11 | 5010C |

The latices set forth above were SBR latices having a bound styrene range of 15 to 60%.

The combining of emulsion systems having different types of stabilizers, will often result in such a dilution of one stabilizer phase that the final blend becomes unstable. For instance, 85 parts of a pre-stabilized asphalt clay emulsion having enough stabilizer to be compatible with 15 parts of an anionic-type latex, may decrease in final product stability if the blend ratio should be changed to 95:5. Certain latex systems carry an excess of stabilizer which maintains mixing stability when dilution is considerable.

The compounding of systems which would be stable when containing less than 7% latex, may be accomplished by pre-processing the latex to be added, by forming a soap-type asphalt-rubber emulsion. Such processing increases the stabilized content, thus permitting considerable dilution of the latex phase without destabilization of the final compound. This process of forming a soap-type asphalt-rubber composition with latex as a portion of the aqueous emulsifier phase, and combining such an emulsion with a pre-stabilized asphalt clay emulsion such as the NX type, results in final mixtures which may have a wide range of latex content at good stability, high solids content, relatively low viscosity and good film properties. Stable systems containing as low as 3.5% latex have been compounded by this method. This method also permits the use of a wide range of asphalt types in the asphalt-latex emulsion portion which can result in further improving and varying the properties obtainable in the final blend. This is further illustrated by Table III.

TABLE III

| Percent latex in blend | Latex No. | Bentonite stabilizer | Product stability |
|---|---|---|---|
| 3.5 | 5010C | 2.7 | Good. |
| 4.8 | 2107 | 2.7 | Do. |
| 5.0 | 2107 | 2.7 | Do. |
| 5.8 | 2107 | 2.7 | Do. |
| 7.5 | 2107 | 2.7 | Do. |
| 8.7 | 2107 | 2.7 | Do. |
| 24.3 | 5010C | 2.7 | Do. |

Typical anionic-type bituminous-latex emulsions that may be combined with pre-stabilized clay-dispersed bituminous emulsions (such as the NX type) are illustrated in Examples 2 to 5. These emulsions were prepared by combining a fluid asphalt with an emulsifier in a colloid mill.

EXAMPLE 2

| | Percent by wt. |
|---|---|
| Asphalt, 50–60 pen. | 40 |
| 2107 latex | 50 |
| 15% rosin soap | 10 |

EXAMPLE 3

| | |
|---|---|
| Asphalt, 50–60 pen. | 42 |
| 2107 latex | 50 |
| 25% rosin soap | 8 |

EXAMPLE 4

| | |
|---|---|
| Asphalt, 50–60 pen. | 40 |
| 2107 latex | 50 |
| 20% Vinsol soap | 10 |

EXAMPLE 5

| | |
|---|---|
| Asphalt, 180–200 pen. | 60 |
| 5010C latex | 28 |
| 12% Vinsol soap | 12 |

A typical composition of Example 5 would be:

| | Percent by wt. |
|---|---|
| Asphalt (melt point, ° F., 105; penetration, 77° F., 190) | 60.35 |
| 5010C latex (solids) | 15.89 |
| Vinsol resin soap (solids) | 1.48 |
| Potassium hydroxide (solids) | 0.22 |
| Methocel (solids) | 0.06 |
| Water | 22.0 |
| | 100.00 |

What is claimed is:

1. An aqueous anionic emulsion composition comprising (1) a bituminous emulsion containing between about 58–65% solids and an effective amount of a mineral colloidal clay dispersing agent, (2) a stabilizing amount of a stabilizer selected from the group consisting of a water soluble alkali metal oxalates, ammonium oxalate and mixtures thereof, wherein the ratio of said mineral colloidal clay to stabilizer is from about 2.5–3 to 1 and (3) between about 3.5 and 30% by weight of an anionic dispersed latex.

2. The aqueous dispersion of claim 1, wherein said stabilizer is sodium oxalate.

3. The aqueous dispersion of claim 1, wherein said stabilizer is potassium oxalate.

4. The aqueous dispersion of claim 1, wherein said stabilizer is ammonium oxalate.

5. The method of producing a stable emulsion system of latex, clay and bituminous material comprising first adding stabilizing amounts of a stabilizing agent selected from the group consisting of a water soluble alkali metal oxalates, ammonium oxalate and mixtures of said oxalates to a colloidal clay dispersed bituminous emulsion containing between about 58–65% solids, in which the ratio of said colloidal clay to said stabilizer is from about 2.5–3 to 1, and then combining said stabilized emulsion with about 3.5 to 30% by weight of an anionic dispersed latex emulsion.

6. The method of claim 5, wherein said stabilizer is sodium oxalate.

7. The method of claim 5, wherein said stabilizer is potassium oxalate.

8. The method of claim 5, wherein said stabilizer is ammonium oxalate.

References Cited

UNITED STATES PATENTS

| | | | |
|---|---|---|---|
| 1,831,226 | 11/1931 | Byrd | 260—745 |
| 2,128,464 | 8/1938 | Kirschbraun | 106—277 |
| 2,333,779 | 11/1943 | Groskopf | 106—277 XR |
| 2,353,723 | 7/1944 | Groskopf | 106—277 XR |
| 2,483,836 | 10/1949 | McCoy | 106—277 XR |
| 2,615,819 | 10/1952 | Manzer | 106—277 |

JULIUS FROME, Primary Examiner

JOAN B. EVANS, Assistant Examiner

U.S. Cl. X.R.

252—311.5; 260—28.5, 29.7, 745, 746, 758, 760, 720